Figures 1, 2, 3:
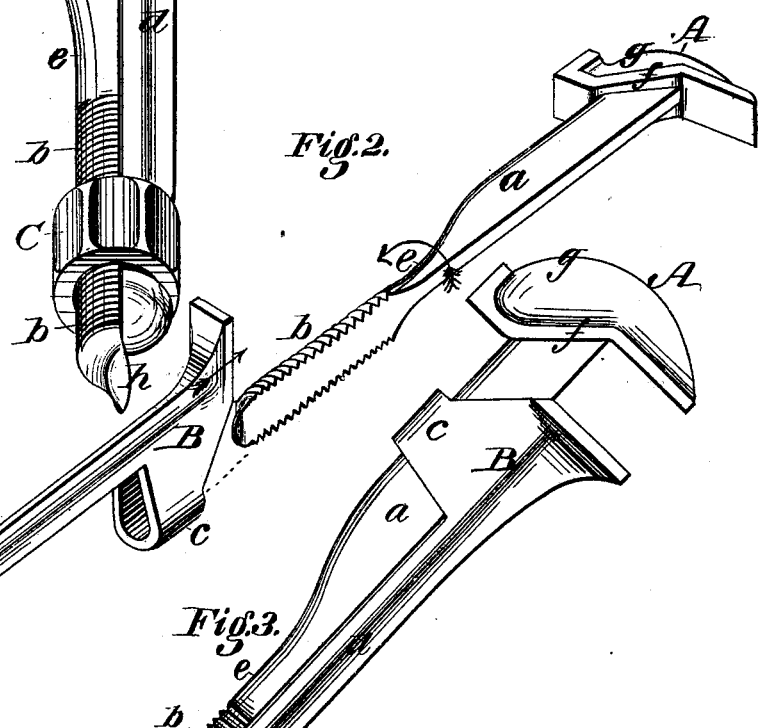

H. H. HILL.
Wrench.

No. 206,733. Patented Aug. 6, 1878.

Witnesses:
Donn J. Twitchell.
Will W. Dodge.

Inventor:
H. H. Hill
By his attys.
Dodger Son

UNITED STATES PATENT OFFICE.

HENRY H. HILL, OF MOLINE, ILLINOIS.

IMPROVEMENT IN WRENCHES.

Specification forming part of Letters Patent No. 206,733, dated August 6, 1878; application filed December 29, 1877.

*To all whom it may concern:*

Be it known that I, HENRY H. HILL, of Moline, Rock Island county, State of Illinois, have invented certain Improvements in Adjustable Wrenches, of which the following is a specification:

This invention relates to that class of cheap cast-metal wrenches which are composed of two jaws having long shanks united and adjusted by means of an encircling nut; and the object of the invention is to give such wrenches additional strength, durability, and smoothness of action without increasing their cost; and to this end the invention consists in the peculiar construction and combination of parts hereinafter described.

Figure 1 represents a perspective view of my wrench; Fig. 2, a perspective view showing the two jaws disconnected, but in position to be united; Fig. 3, a side elevation of the wrench.

Referring to the drawings, A represents a head or jaw provided with a long shank, $a$, the end of which is made of a semicircular form in cross-section and provided with a screw-thread, as shown at $b$. B represents a second jaw, provided with an eye, $c$, adapted to encircle the shank $a$ of the jaw A, and also provided with a long shank, $d$, the end of which is made of a semicircular form and provided on the rounding side with a groove to receive one side of the nut C.

In assembling the parts the shank $a$ is inserted through the eye of the jaw B, the nut C applied to the grooved end of the shank $d$, and rotated so as to draw the threaded end $b$ of the shank $a$ down therein, as shown in Figs. 1 and 2. The nut thus applied serves to both unite the jaws and to adjust them with reference to each other. In order to prevent the accidental separation of the parts the end of the shank $a$ is bent downward after the parts are assembled, as shown at $h$, Figs. 1 and 3, so as to prevent the shank from being screwed upward out of the nut.

The shank $a$ is made of considerable width from front to rear, in order to give the necessary strength and stiffness, while, in order to render it as light as possible, it is made comparatively thin.

In order that the eye of the jaw B may be passed over the threaded portion $b$ of the shank, and thence upon the main shank $a$, the latter is reduced in width and rounded at the point $e$ adjacent to the screw-thread, as shown in Figs. 1 and 2, so that in assembling the parts the screw-thread is first passed flatwise through the eye $c$ until the point $e$ is reached, when it is given a quarter-rotation to bring it into position to enter the eye. The manner in which the jaws are thus united is clearly represented in Fig. 2, the jaw B being shown in position to receive the threaded shank, while the curved arrow upon the latter indicates the manner in which it is subsequently turned to bring its shank into the required position to enter the eye. Instead of reducing the shank the eye $c$ may be made of a round form, so as to slip readily over the screw-thread, after which it will be flattened down by hammering, in order to adapt it to pass upon the shank $a$. In order to give the wrench additional strength and prevent the jaws from breaking or giving way under excessive strain the upper jaw, A, is extended diagonally downward and backward across the shank $a$, and strengthened on the outside by a central rib, $g$, rounded outward and backward in the manner shown in the drawing. The jaw B, in order that it may close against the jaw A, is cut away on its rear side to correspond with the inclination of jaw A, as shown.

I am aware that cast-metal wrenches consisting of two jaws and a nut have been made in a great variety of forms, and I lay no claim, broadly, thereto.

In wrenches of the class represented in the drawings it has hitherto been customary to connect the jaw B with the shank of jaw A by means of lips or ears on the former engaging under longitudinal ribs on the side of the latter. Wrenches thus constructed have, in practice, been found defective and objectionable, in that when subjected to excessive strains the lips were bent or broken and the jaws permitted to separate. In my wrench, having the eye $c$ arranged to encircle the shank $a$, the separation of the jaws is effectually prevented, and this while retaining the other features considered advantageous in this class of wrenches.

I am also aware that it is old to extend a wrench-jaw diagonally across the bar or shank; but I am not aware that any wrench hitherto constructed has been provided with a diagonal head and with a central outwardly-curved strengthening-rib in the manner shown—a construction which gives my wrench far greater strength than those hitherto produced, and this without adding to its weight.

Having thus described my invention, what I claim is—

1. The cast-metal wrench consisting of the jaw A, having the shank $a$ and the semicircular threaded stem $b$, the jaw B, having the curved shank $d$ and the eye $e$, adapted to encircle the shank $a$, and the nut C, encircling and uniting the two shanks, as shown.

2. In combination with the jaw B, the nut C, the sliding jaw A, having the threaded shank $b$, with its end $h$ bent downward in the manner shown, to prevent the separation of the parts.

3. In combination with the jaw B, having the eye $e$, the jaw A, provided with a wide shank, $a$, threaded portion $b$, and the reduced and rounded part $e$, to admit of the application of the jaw B, as described and shown.

4. In combination with the shank $a$, the wrench head or jaw A, extending diagonally across said shank from front to rear and provided with the central outwardly-curved strengthening-rib $g$, of the form shown and described.

5. A cast-metal wrench having two jaws, with arms or shanks cast thereon, united by means of the nut C, encircling both shanks, and the eye $e$ cast upon one jaw and encircling the shank of the other, as shown.

HENRY H. HILL.

Witnesses:
GEORGE H. HILL,
BENJ. W. HILL.